United States Patent
Ishibashi et al.

(10) Patent No.: US 11,912,169 B1
(45) Date of Patent: Feb. 27, 2024

(54) UTILITY VEHICLE

(71) Applicant: KAWASAKI MOTORS, LTD., Hyogo (JP)

(72) Inventors: Kazuki Ishibashi, Akashi (JP); Yusuke Nakashima, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/816,873

(22) Filed: Aug. 2, 2022

(51) Int. Cl.
*B60N 2/38* (2006.01)
*B60N 2/015* (2006.01)

(52) U.S. Cl.
CPC .......... *B60N 2/01516* (2013.01); *B60N 2/38* (2013.01); *B60Y 2200/20* (2013.01); *B60Y 2410/10* (2013.01)

(58) Field of Classification Search
CPC .. B60N 2/01516; B60N 2/38; B60Y 2200/20; B60Y 2410/10
USPC ...................... 297/378.13, 378.14; 296/65.16
See application file for complete search history.

(56) References Cited

U.S. PATENT DOCUMENTS

| | | | | |
|---|---|---|---|---|
| 3,047,331 A | * | 7/1962 | Porsche | B62D 21/10 296/37.16 |
| 4,637,648 A | * | 1/1987 | Okino | B60N 2/366 297/378.13 |
| 7,611,184 B1 | * | 11/2009 | Bisson | B60R 5/006 296/37.16 |
| 8,727,416 B2 | * | 5/2014 | Nakazawa | B60R 11/06 206/349 |
| 2010/0141004 A1 | * | 6/2010 | Zeimis, III | B60N 2/3011 297/335 |
| 2011/0304160 A1 | * | 12/2011 | Kamata | B60N 2/366 292/197 |
| 2012/0161427 A1 | * | 6/2012 | Tsumiyama | B60J 5/0487 292/341.15 |
| 2013/0154332 A1 | | 6/2013 | Lindsay | |
| 2022/0079344 A1 | * | 3/2022 | Shin | B60N 2/3011 |
| 2022/0097631 A1 | * | 3/2022 | Dhamrat | B60N 2/5685 |
| 2022/0220872 A1 | * | 7/2022 | Girondi | B01D 46/2403 |

* cited by examiner

*Primary Examiner* — Amy R Weisberg
*Assistant Examiner* — Sara Laghlam
(74) *Attorney, Agent, or Firm* — Studebaker & Brackett PC

(57) ABSTRACT

A utility vehicle 100 includes a vehicle body 1, seats 4R having seat bottoms 41 and seat backs 42 attached to the vehicle body 1, and an electric component box 65 having an access opening 67 positioned at the rear of the seat back 42. The seat 4R further has a detacher 43 that detachably attaches the seat back 42 to the vehicle body 1.

7 Claims, 7 Drawing Sheets

UTILITY VEHICLE

FIELD

The technique disclosed herein relates to a utility vehicle.

BACKGROUND

For example, in a vehicle disclosed in U.S. Patent Application Publication No. 2013/0154332, a seat back of a seat is tilted forward, and in this manner, an access to an opening of a housing at the rear of the seat back is made.

SUMMARY

However, in the above-described vehicle, accessibility to the access opening of the housing at the rear of the seat is not sufficient, and there is still room for improvement.

The technique disclosed herein has been made in view of such a point, and an object thereof is to improve the accessibility to the access opening of the housing at the rear of the seat.

The utility vehicle disclosed herein includes a vehicle body, a seat having a seat bottom and a seat back attached to the vehicle body, and a housing having an access opening positioned at the rear of the seat back. The seat further has a detacher that detachably attaches the seat back to the vehicle body.

DESCRIPTION OF EMBODIMENTS

Hereinafter, an exemplary embodiment will be described in detail based on the drawings.

Figure 1:
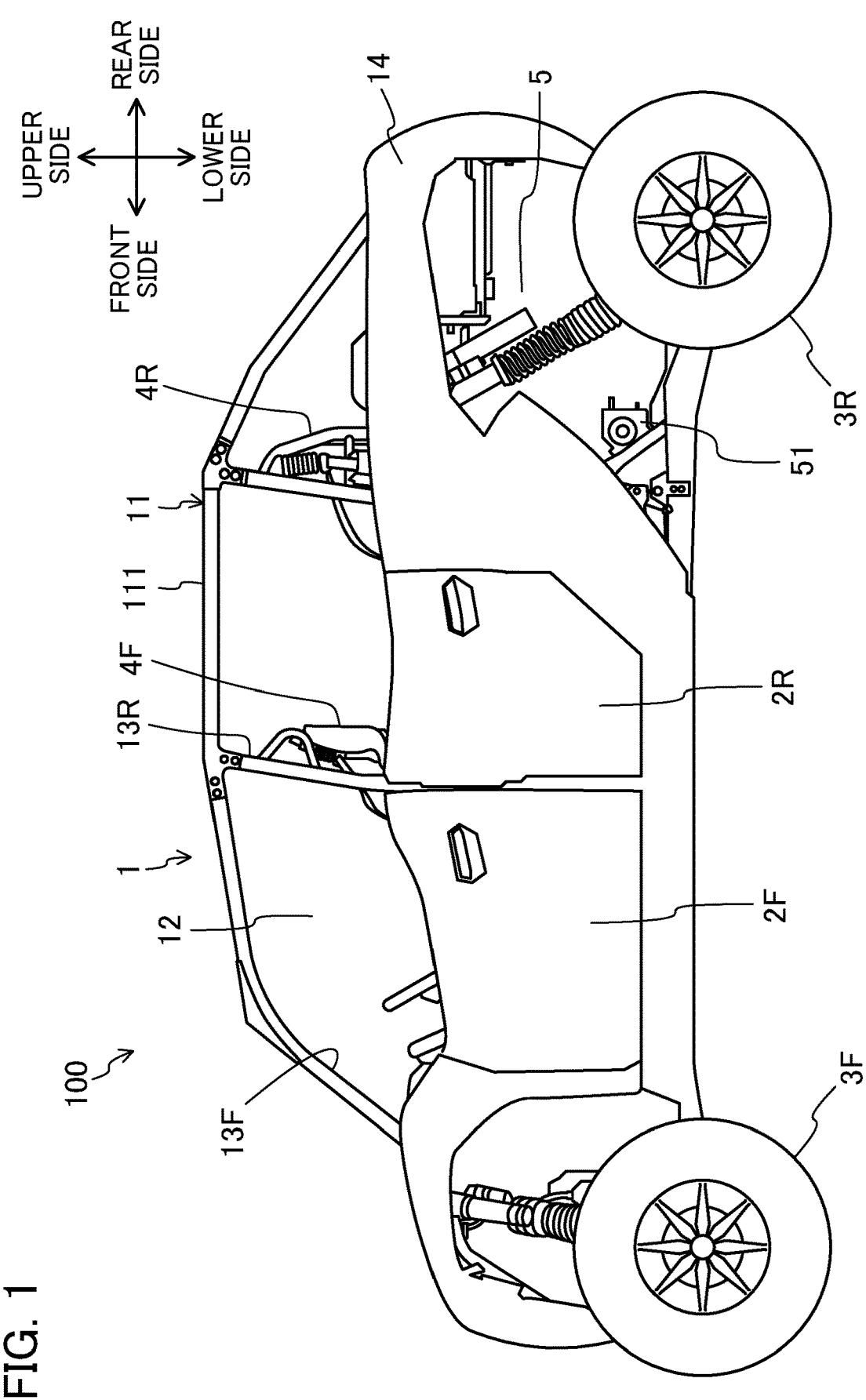
FIG. 1 is a left side view showing an outline configuration of a utility vehicle.

FIG. 1 is a left side view showing an outline configuration of a utility vehicle 100. The utility vehicle 100 is an automobile that can travel off road. The utility vehicle 100 includes a vehicle body 1, front doors 2F and rear doors 2R, front wheels 3F and rear wheels 3R, front seats 4F and rear seats 4R, and an engine room 5.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction that is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

The vehicle body 1 has a vehicle body frame 11, side covers 14, etc. The side cover 14 covers at least part of a side surface of the vehicle body frame 11. A cabin 12 that is a space where an occupant is present is defined in the vehicle body 1. A front entrance 13F and a rear entrance 13R causing the cabin 12 and the outside of the vehicle to communicate with each other are at a side portion of the vehicle body frame 11, i.e., a side portion of the vehicle body 1. In this example, the front entrances 13F and the rear entrances 13R are, although not shown in the figure, at both right and left side portions of the vehicle body 1.

The vehicle body frame 11 has a rollover protection structure 111 commonly known as ROPS. The rollover protection structure 111 protects the occupant when the utility vehicle 100 overturns. The rollover protection structure 111 defines upper portions of the front entrances 13F and the rear entrances 13R.

The front door 2F opens or closes the front entrance 13F, specifically part of the front entrance 13F. The rear door 2R opens or closes the rear entrance 13R, specifically part of the rear entrance 13R. That is, the front door 2F and the rear door 2R in this example are of a so-called half door type, and do not have windows. The front wheels 3F are each on the right and left sides and the rear wheels 3R are each on the right and left sides, and these front and rear wheels 3F, 3R support the vehicle body 1.

The front seats 4F and the rear seats 4R are in the cabin 12. The front seat 4F and the rear seat 4R are arranged next to each other in the front-rear direction in the cabin 12. That is, the rear seat 4R is arranged at the rear of the front seat 4F. In this example, the front seats 4F are each on the right and left sides and the rear seats 4R are each on the right and left sides, although not shown in the figure. The rear seat 4R is one example of a seat.

The engine room 5 is at a rear portion in the vehicle body 1, specifically at the rear of the rear seats 4R. The engine room 5 houses a power unit 51 etc. The power unit 51 has, for example, an engine, a transmission that changes the output rotation speed of the engine, a power generation device that generates power by power from the engine, and a battery that stores the power generated by the power generation device. The engine room 5 is one example of a housing.

Figure 2:
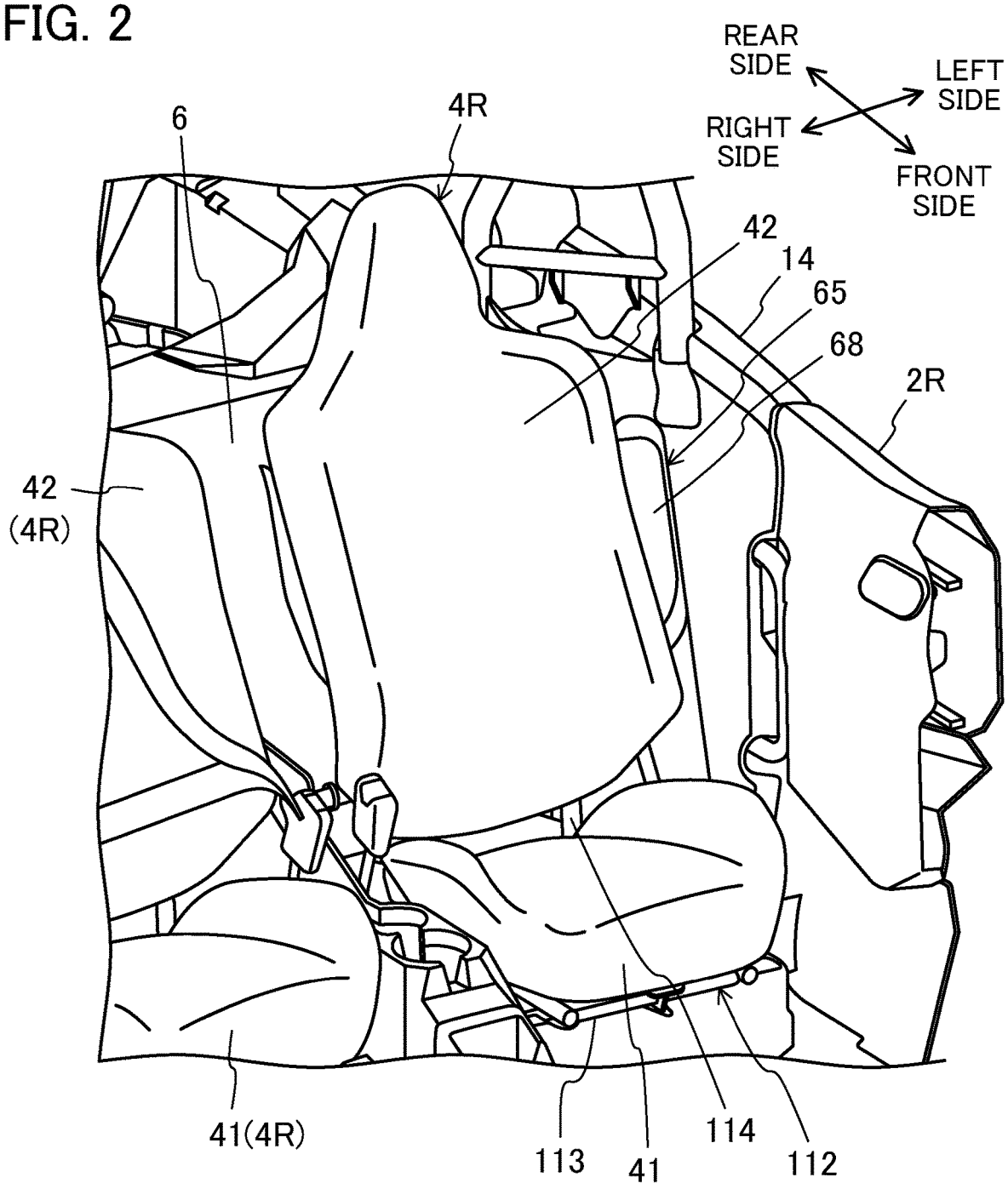
FIG. 2 is a perspective view showing a left rear seat diagonally from a front right side.
Figure 3:
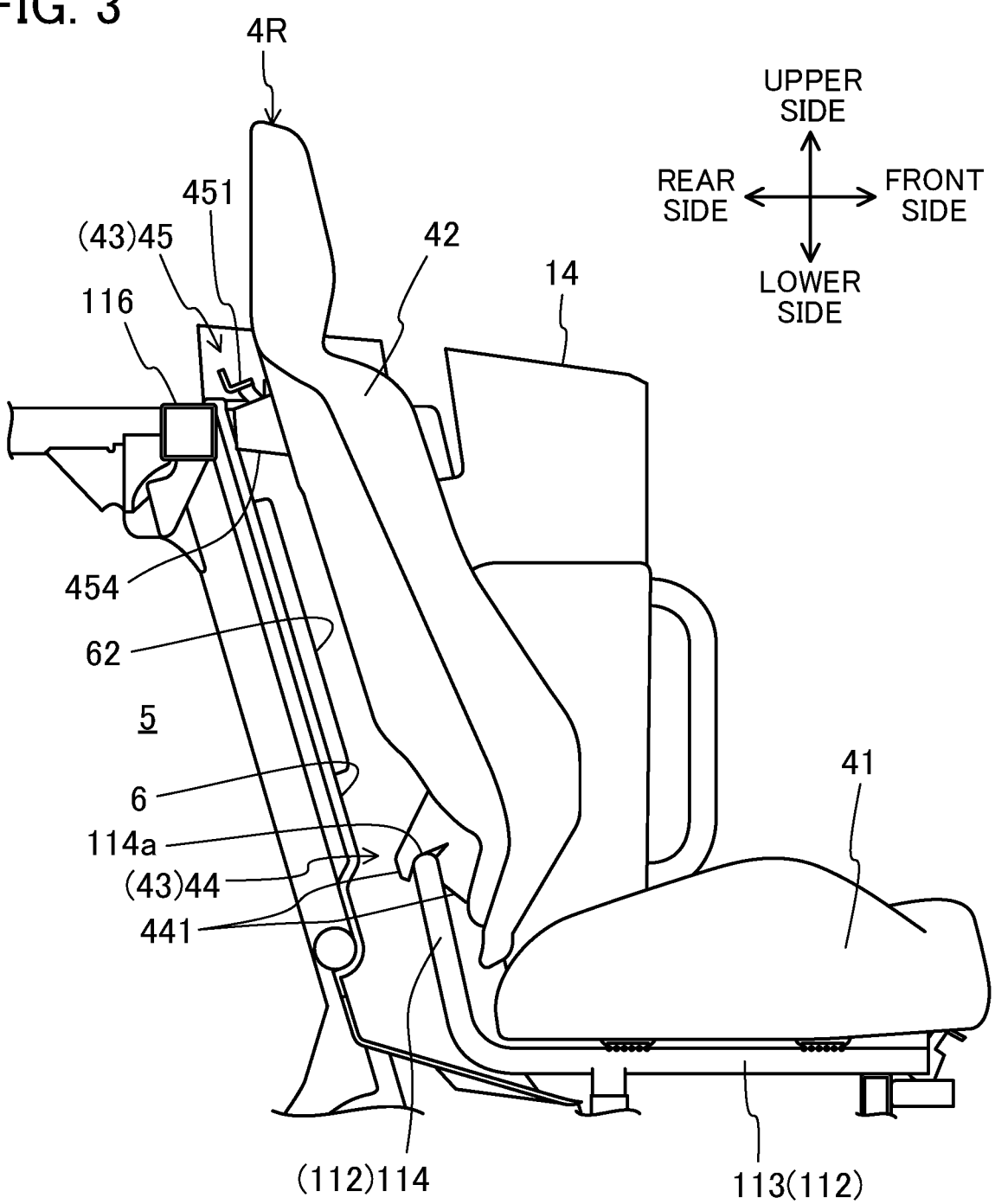
FIG. 3 is a side view showing the left rear seat from an inner side in a vehicle width direction.
Figure 4:
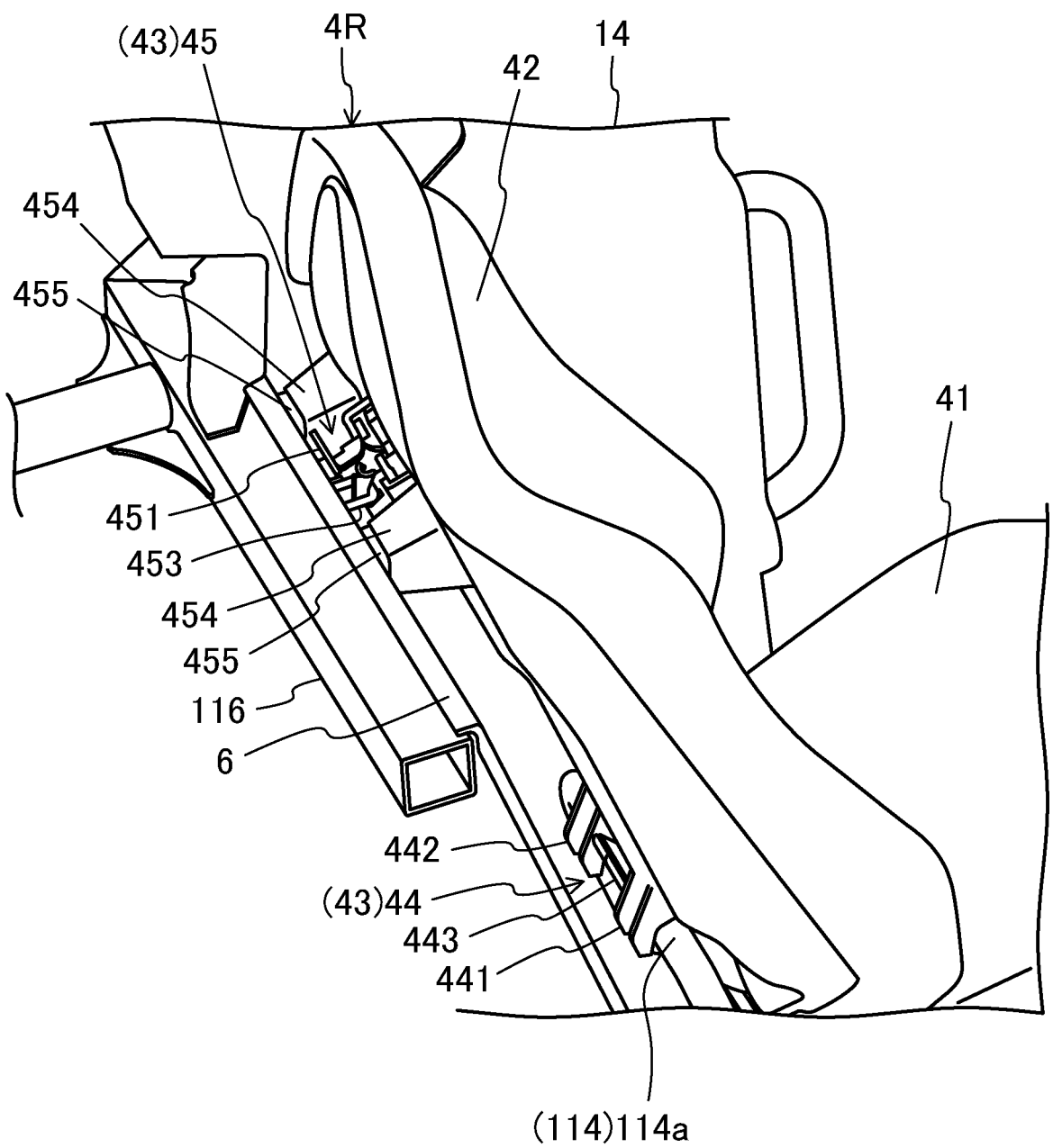
FIG. 4 is a perspective view showing the left rear seat diagonally from a rear right side.

FIG. 2 is a perspective view showing the left rear seat 4R diagonally from the front right side. FIG. 3 is a side view showing the left rear seat 4R from the inner side in the vehicle width direction. FIG. 4 is a perspective view showing the left rear seat 4R diagonally from the rear right side.

The rear seat 4R has a seat bottom 41 and a seat back 42 attached to the vehicle body 1. Specifically, each of the seat bottom 41 and the seat back 42 is attached to the vehicle body frame 11.

Figure 8:
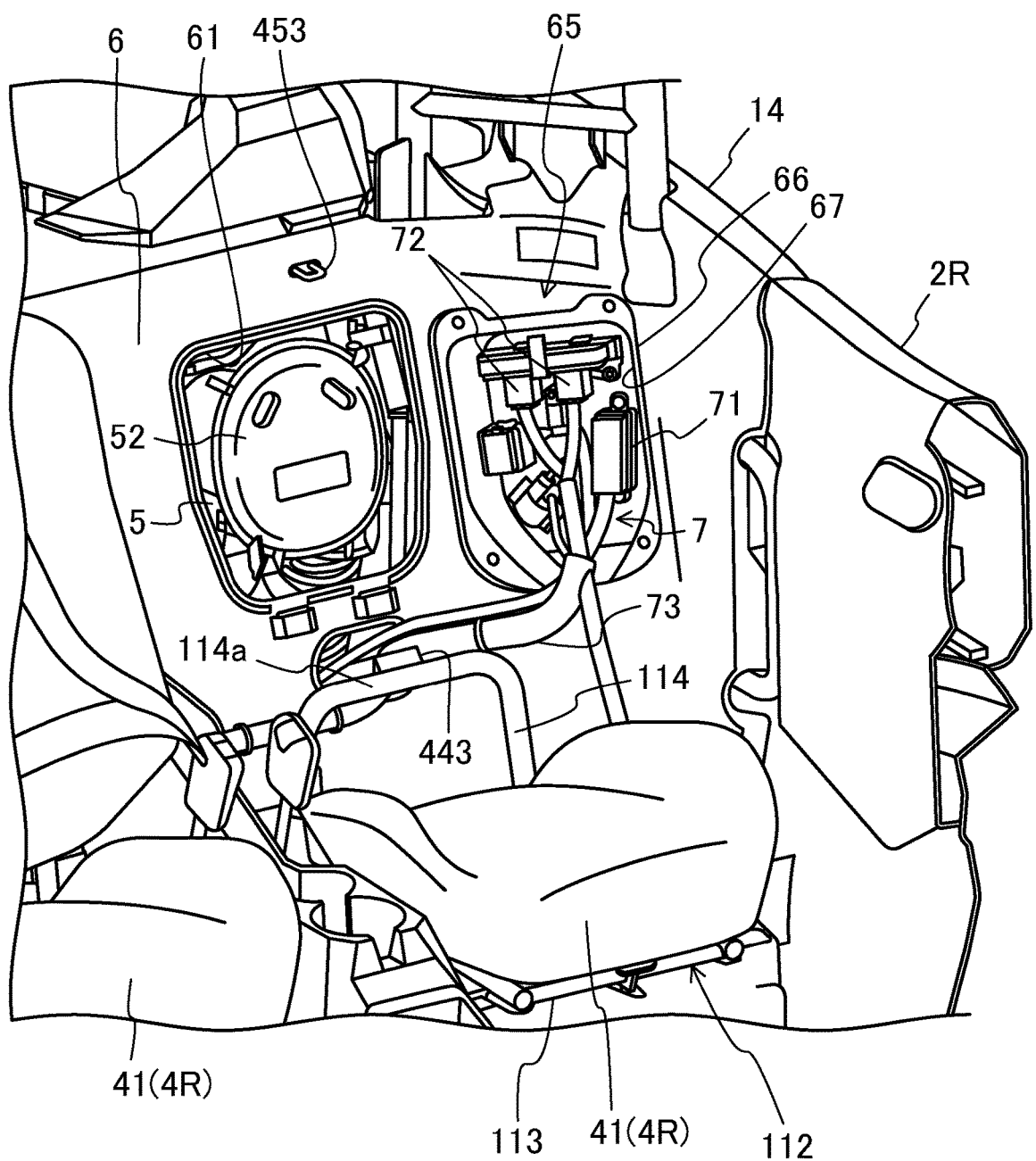
FIG. 8 is a view showing a first access opening and a second access opening with lids detached and corresponding to FIG. 7.

The utility vehicle 100 includes a back panel 6 at the rear of the seat backs 42. The engine room 5 is at the rear of the back panel 6. That is, the back panel 6 divides the cabin 12 and the engine room 5 from each other. Although descried later, the engine room 5 has, as shown in FIG. 8, a first access opening 61 at the back panel 6. The first access opening 61 is positioned at the rear of the seat back 42. Although descried later, the back panel 6 includes, as shown in FIG. 8, an electric component box 65 having a second access opening 67. The second access opening 67 is also positioned at the rear of the seat back 42. The electric component box 65 is one example of the housing. Each of the first access opening 61 and the second access opening 67 is one example of an access opening.

The rear seat 4R further has a detacher 43 that detachably attaches the seat back 42 to the vehicle body 1, specifically the vehicle body frame 11. The detacher 43 has a first locker 44 and a second locker 45.

Figure 5:
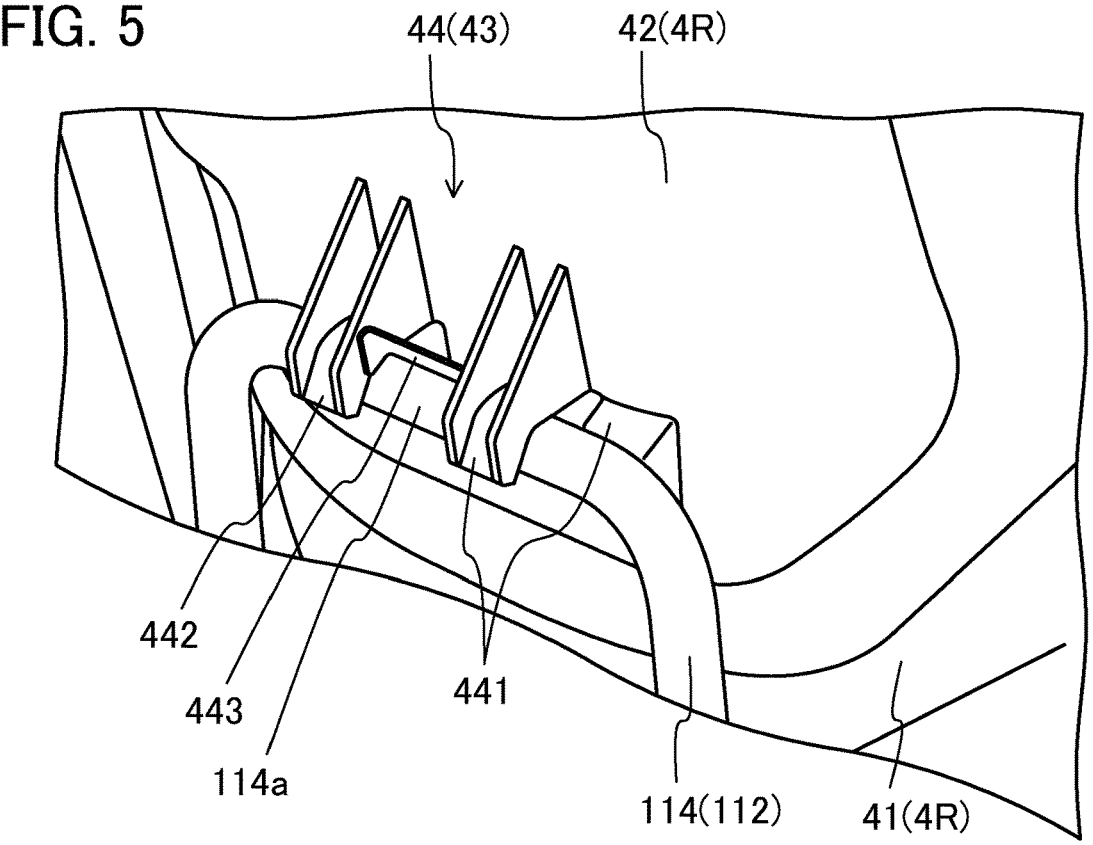
FIG. 5 is a perspective view showing a first locker of the left rear seat diagonally from the rear right side.

FIG. 5 is a perspective view showing the first locker 44 of the left rear seat 4R diagonally from the rear right side. The first locker 44 has a lock target frame 114a extending in the vehicle width direction at the vehicle body 1 and two forked portions 441, 442 at the seat back 42. In a case where these two forked portions 441, 442 are distinguished from each other in description, these two forked portions 441, 442 will be referred to as a first forked portion 441 and a second forked portion 442. As shown in FIG. 3, the first forked portion 441 is branched in the front-rear direction, and is placed over the lock target frame 114a. As in the first forked portion 441, the second forked portion 442 is branched in the front-rear direction, and is placed over the lock target frame 114a.

Specifically, the first forked portion 441 and the second forked portion 442 are at a back surface of the seat back 42, more specifically a lower end portion of the back surface of the seat back 42. The first forked portion 441 and the second forked portion 442 are arranged next to each other in the vehicle width direction at the seat back 42. More specifically, as shown in FIG. 5, the first forked portion 441 is branched in the front-rear direction at positions shifted from each other in the vehicle width direction. Although not shown in the figure, the same also applies to the second forked portion 442.

The seat bottom 41 is attached to a seat frame 112 of the vehicle body frame 11. The lock target frame 114a is part of the seat frame 112. Specifically, as shown in FIG. 3, the seat frame 112 has a first frame 113 to which the seat bottom 41 is attached and a second frame 114 integrated with a rear portion of the first frame 113. Part of the second frame 114 is the lock target frame 114a. That is, as shown in, e.g., FIG. 7, the second frame 114 stands substantially in an inverted U-shape from the rear portion of the first frame 113, and a center portion of the second frame 114 extending in the vehicle width direction is the lock target frame 114a.

In the first locker 44, the forked portions 441, 442 are placed over the lock target frame 114a, and accordingly, the forked portions 441, 442 and the lock target frame 114a are brought into a lock state. That is, the seat back 42 is locked at the lock target frame 114a, and accordingly, displacement of the seat back 42 in the front-rear direction is restricted. On the other hand, the seat back 42 is displaced upwardly, and accordingly, the forked portions 441, 442 and the lock target frame 114a are unlocked from each other. That is, the seat back 42 is detached from the lock target frame 114a.

As described above, according to the first locker 44, the seat back 42 is attached to or detached from the vehicle body 1 only by up-down movement of the seat back 42. Thus, attachment/detachment of the seat back 42 is facilitated.

Further, the first locker 44 has a restriction member 443. The restriction member 443 is at a portion of the lock target frame 114a between the two forked portions 441, 442, and contacts the two forked portions 441, 442 to restrict displacement of the forked portions 441, 442 in the vehicle width direction.

That is, when the seat back 42 is about to displace to the outer side in the vehicle width direction, i.e., the left side, the first forked portion 441 contacts the restriction member 443, and accordingly, leftward displacement of the first forked portion 441 is blocked. When the seat back 42 is about to displace to the inner side in the vehicle width direction, i.e., the right side, the second forked portion 442 contacts the restriction member 443, and accordingly, rightward displacement of the second forked portion 442 is blocked. Thus, the stable lock state of the forked portions 441, 442 and the lock target frame 114a is ensured.

Figure 6:
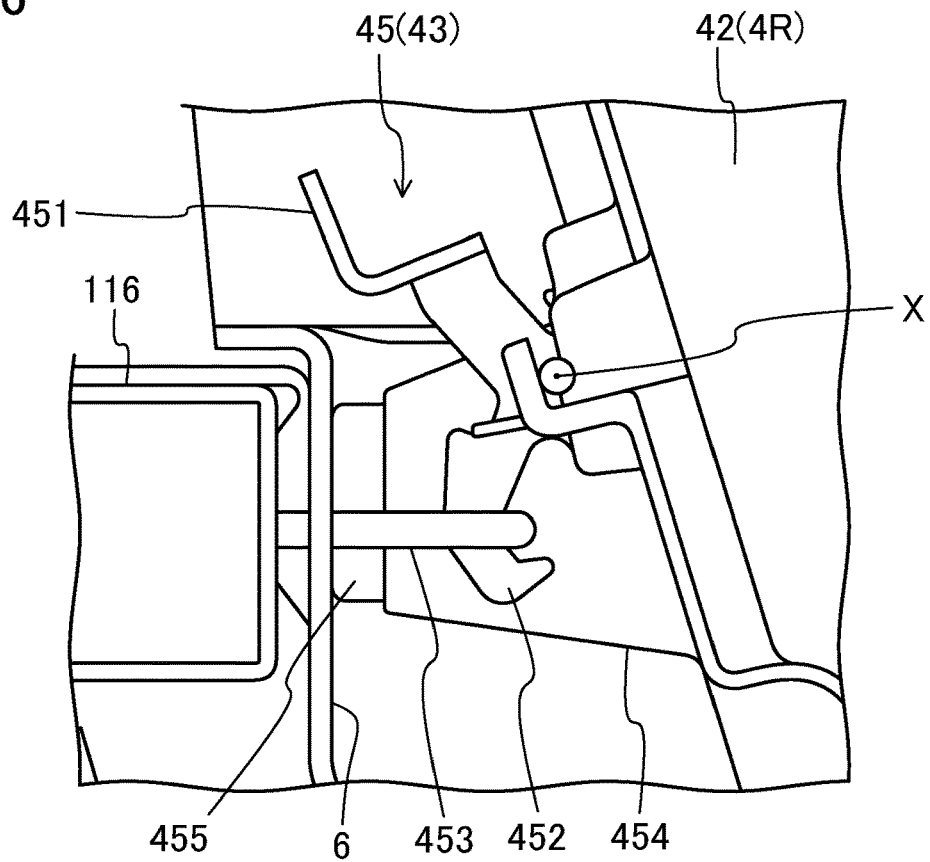
FIG. 6 is a side view showing a second locker of the left rear seat from the inner side in the vehicle width direction.

FIG. 6 is a side view showing the second locker 45 of the left rear seat 4R from the inner side in the vehicle width direction. The second locker 45 has a lock target portion 453 at the vehicle body 1 and a lock lever 451 at the seat back 42. The second locker 45 switches, by turning of the lock lever 451, the lock lever 451 and the lock target portion 453 between a lock state in which the lock lever 451 is locked at the lock target portion 453 and an unlock state in which the lock lever 451 and the lock target portion 453 are unlocked from each other.

Specifically, the lock target portion 453 is at the vehicle body frame 11 positioned at the rear of the seat back 42. More specifically, the lock target portion 453 is at a cross member 116 of the vehicle body frame 11. The cross member 116 is a frame to which the back panel 6 is attached, and extends in the vehicle width direction. The lock target portion 453 protrudes toward the cabin 12 from the cross member 116 through the back panel 6. The lock target portion 453 is in an annular shape opening in the up-down direction.

The lock lever 451 is at the back surface of the seat back 42, more specifically above the forked portions 441, 442 at the back surface of the seat back 42. That is, the lock lever 451 is at an upper portion of the back surface of the seat back 42. As shown in FIG. 6, the lock lever 451 is, at the back surface of the seat back 42, turnable about an axis X extending in the vehicle width direction. A tip end portion of the lock lever 451 is a hook portion 452 to be locked at the lock target portion 453. The second locker 45 has a not-shown coil spring. The coil spring biases the lock lever 451 to the rear side.

In the second locker 45, the lock lever 451 is turned, and in this manner, the lock lever 451 and the lock target portion 453 are switched between the lock state in which the lock lever 451 is locked at the lock target portion 453 and the unlock state in which the lock lever 451 and the lock target portion 453 are unlocked from each other. Specifically, when the lock lever 451 is turned to the rear side in the front-rear direction, the hook portion 452 of the lock lever 451 is locked at the lock target portion 453 and the lock lever 451 and the lock target portion 453 are brought into the lock state accordingly, as shown in FIG. 6. When the lock lever 451 is turned to the front side in the front-rear direction, the hook portion 452 of the lock lever 451 is detached from the lock target portion 453, and the lock lever 451 and the lock target portion 453 are brought into the unlock state accordingly.

More specifically, the second locker 45 further has pressing portions 454. In this example, the second locker 45 has two pressing portions 454. The two pressing portions 454 are at the back surface of the seat back 42. Specifically, the two pressing portions 454 are on both sides of the lock lever 451 in the vehicle width direction. The pressing portion 454 protrudes toward the back panel 6 from the back surface of the seat back 42.

In the lock state, the two pressing portions 454 are pressed against the back panel 6 and therefore the cross member 116.

That is, in the second locker 45, the lock lever 451 is, upon switching to the lock state, turned to the rear side in the front-rear direction while tip ends 455 of the pressing portions 454 are pressed against the cross member 116. Accordingly, the seat back 42 is firmly attached to the cross member 116. Note that the tip end 455 of the pressing portion 454 is, for example, made of rubber.

As described above, in the second locker 45, the lock lever 451 is turned in a certain direction, and accordingly, the lock lever 451 and the lock target portion 453 are brought into the lock state. That is, the seat back 42 is attached to the cross member 116. On the other hand, the lock lever 451 is turned in the direction opposite to the certain direction, the lock lever 451 and the lock target portion 453 are unlocked from each other. That is, the seat back 42 is detached from the cross member 116.

As described above, according to the second locker 45, the seat back 42 can be attached to or detached from the vehicle body 1 only by turning of the lock lever 451. Thus, attachment/detachment of the seat back 42 is facilitated.

Figure 7:
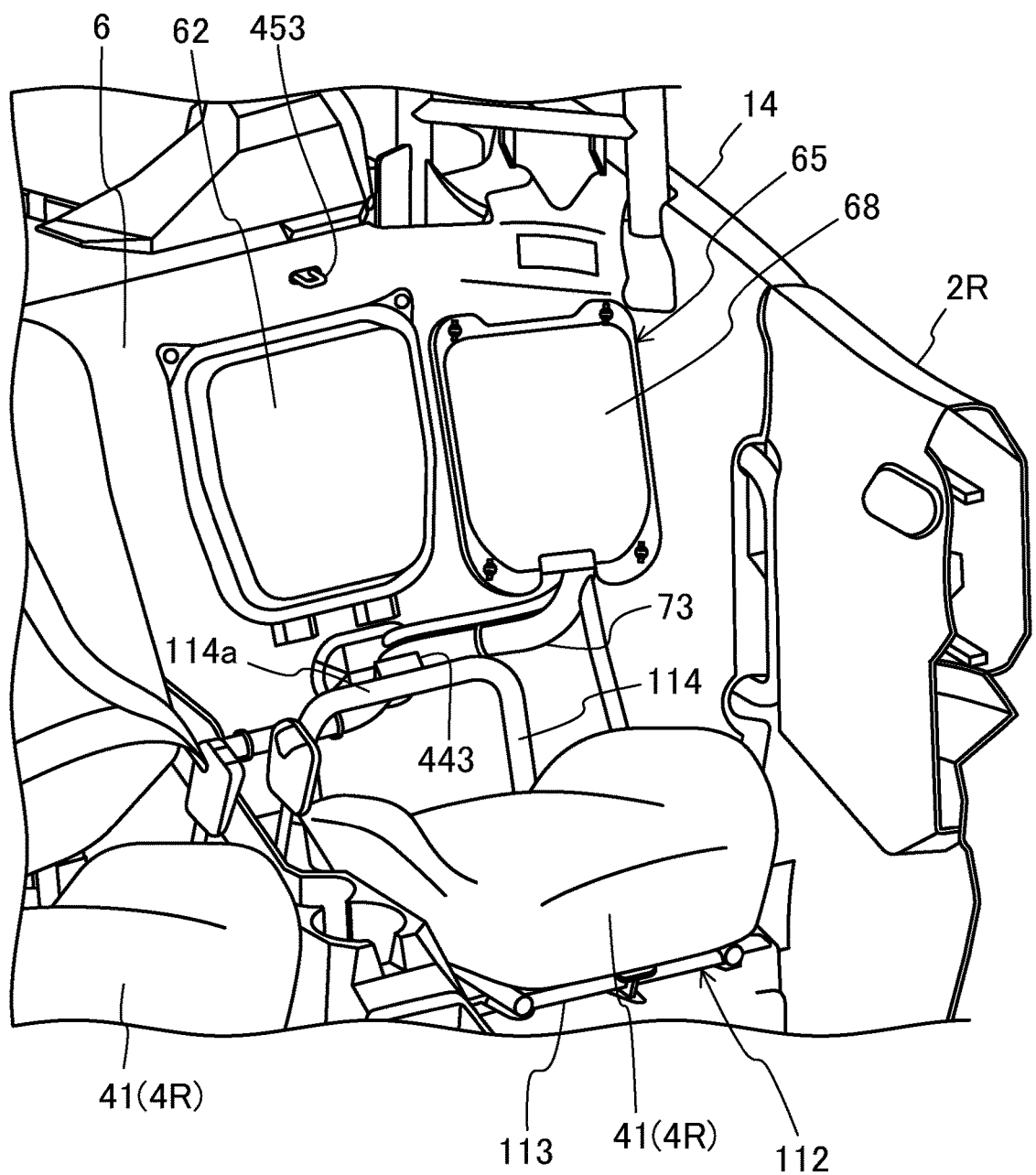
FIG. 7 is a perspective view showing, diagonally from the front right side, the left rear seat with a seat back detached.

FIG. 7 is a perspective view showing, diagonally from the front right side, the left rear seat 4R with the seat back 42 detached. FIG. 8 is a view showing the first access opening 61 and the second access opening 67 with lids 62, 68 detached and corresponding to FIG. 7.

The engine room 5 has the lid 62 closing the first access opening 61 at the back panel 6. In the engine room 5, the power unit 51 is housed, and an air cleaner 52 is housed. Although not shown in the figure, the air cleaner 52 has a filter that cleans external air. The external air cleaned by the air cleaner 52 is supplied to the engine of the power unit 51.

The air cleaner 52 is, in the engine room 5, housed at a position corresponding to the first access opening 61. That is, the first access opening 61 is an opening for accessing the air cleaner 52 housed in the engine room 5. For example, maintenance of the air cleaner 52, such as replacement of the filter, is performed through the first access opening 61. Normally, the first access opening 61 is closed with the lid 62, and therefore, entrance of water or dust into the engine room 5 is reduced.

The electric component box 65 is on the left side of the first access opening 61 in the back panel 6. The electric component box 65 houses electric components 7. Specifically, the electric component box 65 has a box body 66 having the second access opening 67 and the lid 68 closing the second access opening 67. The box body 66 is part of the back panel 6. That is, the box body 66 is integrated with the back panel 6. As described above, the first access opening 61 and the second access opening 67 are opened to the cabin 12.

The electric components 7 housed include, for example, an electronic control unit 71, a relay 72, and a harness 73. Although not shown in the figure, the electric components 7 housed further include, for example, a fuse, a breaker, and a terminal. Maintenance of these electric components 7, such as replacement, is performed through the second access opening 67. Normally, the second access opening 67 is closed with the lid 68, and therefore, entrance of water or dust into the electric component box 65 is reduced.

After the seat back 42 of the rear seat 4R has been detached, there is no obstacle around the first access opening 61 and the second access opening 67, as shown in FIGS. 7 and 8. That is, as compared to a typical form in which a seat back is tilted forward, a sufficient space for accessing the first access opening 61 and the second access opening 67 from a cabin 12 side is ensured. Thus, accessibility to the first access opening 61 etc. is improved.

As described above, the utility vehicle 100 includes the vehicle body 1, the rear seats 4R as the seats, and the housing. The rear seat 4R has the seat bottom 41 and the seat back 42 attached to the vehicle body 1. The housing has the first access opening 61 and the second access opening 67 positioned at the rear of the seat back 42. The rear seat 4R further has the detacher 43 that detachably attaches the seat back 42 to the vehicle body 1.

According to this configuration, the detacher 43 for the seat back 42 allows the seat back 42 to be easily detached. The seat back 42 is detached so that a sufficient access space for accessing the first access opening 61 and the second access opening 67 positioned at the rear of the seat back 42 can be ensured. Thus, the accessibility to the first access opening 61 etc. can be improved in combination with easy detachment of the seat back 42.

The detacher 43 has the lock target portion 453 at the vehicle body 1 and the lock lever 451 at the seat back 42. The detacher 43 switches, by turning of the lock lever 451, the lock lever 451 and the lock target portion 453 between the lock state in which the lock lever 451 is locked at the lock target portion 453 and the unlock state in which the lock lever 451 and the lock target portion 453 are unlocked from each other.

According to this configuration, the lock lever 451 is turned in the certain direction, and accordingly, the lock lever 451 and the lock target portion 453 are brought into the lock state. That is, the seat back 42 is attached to the vehicle body 1. On the other hand, the lock lever 451 is turned in the direction opposite to the certain direction, and accordingly, the lock lever 451 and the lock target portion 453 are unlocked from each other. That is, the seat back 42 is detached from the vehicle body 1. As described above, according to the detacher 43, the seat back 42 can be attached to or detached from the vehicle body 1 only by turning of the lock lever 451. Thus, easy attachment/detachment of the seat back 42 can be achieved.

The lock target portion 453 is positioned at the rear of the seat back 42, and the lock lever 451 is at the back surface of the seat back 42.

According to this configuration, a load acting on the seat back 42 can be properly supported. That is, the direction of action of the load on the seat back 42 is generally the front-rear direction, but the detacher 43 such as the lock lever 451 is at the rear of the seat back 42 so that the detacher 43 can rearwardly transmit the load acting on the seat back 42 along the direction of action of such a load. Thus, the load acting on the seat back 42 can be properly supported.

The detacher 43 further has the lock target frame 114a extending in the vehicle width direction at the vehicle body 1 and the forked portions 441, 442 positioned at the seat back 42, branched in the front-rear direction, and placed over the lock target frame 114a.

According to this configuration, the forked portions 441, 442 are placed over the lock target frame 114a, and accordingly, the forked portions 441, 442 and the lock target frame 114a are brought into the lock state. That is, the seat back 42 is locked at the lock target frame 114a so that displacement of the seat back 42 in the front-rear direction can be restricted. Thus, the lock state of the seat back 42 can be stabilized. On the other hand, the seat back 42 is displaced upwardly so that the forked portions 441, 442 and the lock target frame 114a are unlocked from each other. That is, the seat back 42 is detached from the lock target frame 114a. As described above, according to the detacher 43, the seat back 42 can be attached to or detached from the vehicle body 1 only by up-down movement of the seat back 42. Thus, the stable lock state of the seat back 42 can be achieved, and easy attachment/detachment of the seat back 42 can be achieved.

The two forked portions 441, 442 are arranged next to each other in the vehicle width direction at the seat back 42. The detacher 43 further has the restriction member 443 positioned at the portion of the lock target frame 114*a* between the two forked portions 441, 442 and contacting the two forked portions 441, 442 to restrict displacement of the forked portions 441, 442 in the vehicle width direction.

According to this configuration, when the seat back 42 is about to displace in the vehicle width direction, one of the forked portions 441, 442 contacts the restriction member 443. Thus, displacement of the seat back 42 in the vehicle width direction is blocked. Consequently, the stable lock state of the forked portions 441, 442 and the lock target frame 114*a* can be ensured.

The vehicle body 1 has the seat frame 112 to which the seat bottom 41 is attached. The lock target frame 114*a* is part of the seat frame 112.

According to this configuration, part of the seat frame 112 can be utilized as the lock target frame 114*a*. Thus, another frame as the lock target frame 114*a* is not necessarily prepared, and therefore, the number of components can be reduced.

The housing is the electric component box 65 housing the electric components 7.

According to this configuration, the accessibility to the second access opening 67 of the electric component box 65 positioned at the rear of the seat back 42 is improved. Thus, maintenance of the electric components 7 is facilitated.

The housing is the engine room 5 housing the power unit 51 and housing the air cleaner 52 at the position corresponding to the first access opening 61.

According to this configuration, the accessibility to the first access opening 61, i.e., the air cleaner 52, positioned at the rear of the seat back 42 is improved. Thus, maintenance of the air cleaner 52 is facilitated.

The engine room 5 has the lid 62 closing the first access opening 61, and the electric component box 65 has the lid 68 closing the second access opening 67.

According to this configuration, entrance of water or dust into the engine room 5 and the electric component box 65 can be reduced.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described in the above-described embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, in the second locker 45 of the detacher 43, the lock lever 451 may be at the cross member 116, and the lock target portion 453 may be at the back surface of the seat back 42.

The second locker 45 is not limited to the above-described configuration, and may have any configuration as long as the seat back 42 can be attached or detached with so-called one touch.

In the first locker 44 of the detacher 43, the number of forked portions may be one or three or more.

The installation positions of the first locker 44 and the second locker 45 are not limited to those described above.

The housing is not limited to the electric component box 65 and the engine room 5. The housing may be only one of the electric component box 65 or the engine room 5.

The first locker 44 may be omitted as long as the lock state of the seat back 42 by the second locker 45 is stable.

The technique disclosed herein is not limited to the form in which the seat back 42 is attached to the vehicle body 1, and may also be applicable to a form in which a seat back is attached to a seat bottom. That is, the detacher is configured to detachably attach the seat back to the seat bottom.

What is claimed:

1. A utility vehicle comprising:
   a vehicle body;
   a seat having a seat bottom and a seat back attached to the vehicle body; and
   a housing having an access opening positioned at a rear of the seat back,
   wherein the seat further has a detacher that detachably attaches the seat back to the vehicle body,
   the detacher has a lock target portion at the vehicle body and a lock lever at the seat back, and switches, by turning of the lock lever, the lock lever and the lock target portion between a lock state in which the lock lever is locked at the lock target portion and an unlock state in which the lock lever and the lock target portion are unlocked from each other, and
   the detacher further has a lock target frame extending in a vehicle width direction of the vehicle body at the vehicle body and a forked portion positioned at the seat back, branched in a front-rear direction, and placed over the lock target frame.

2. The utility vehicle of claim 1, wherein
   the lock target portion is positioned at the rear of the seat back, and
   the lock lever is at a back surface of the seat back.

3. The utility vehicle of claim 1, wherein
   the forked portion includes two forked portions arranged next to each other in the vehicle width direction at the seat back, and
   the detacher further has a restriction member positioned at a portion of the lock target frame between the two forked portions and contacting the two forked portions to restrict displacement of the forked portions in the vehicle width direction.

4. The utility vehicle of claim 1, wherein
   the vehicle body has a seat frame to which the seat bottom is attached, and
   the lock target frame is part of the seat frame.

5. The utility vehicle of claim 1, wherein
   the housing is an electric component box housing an electric component.

6. The utility vehicle of claim 1, wherein
   the housing is an engine room housing a power unit and housing an air cleaner at a position corresponding to the access opening.

7. The utility vehicle of claim 5 or 6, wherein
   the housing has a lid closing the access opening.

* * * * *